United States Patent
Bach et al.

(10) Patent No.: US 6,619,822 B2
(45) Date of Patent: Sep. 16, 2003

(54) ARRANGEMENT FOR PROVIDING INDIRECT LIGHTING IN A VEHICLE

(75) Inventors: Gerhard Bach, Leonberg (DE); Joachim Selinger, Muehlacker (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 10/079,888

(22) Filed: Feb. 22, 2002

(65) Prior Publication Data

US 2002/0114164 A1 Aug. 22, 2002

(30) Foreign Application Priority Data

Feb. 22, 2001 (DE) .......................... 101 08 491

(51) Int. Cl.⁷ .............. B60Q 1/00; B60Q 1/26
(52) U.S. Cl. .......... 362/488; 362/496; 362/489; 362/30; 362/546; 362/85; 362/511; 362/503
(58) Field of Search .......... 362/496, 489, 362/488, 30, 546, 85, 511, 503

(56) References Cited

U.S. PATENT DOCUMENTS

| | | | |
|---|---|---|---|
| 1,723,863 A | * | 8/1929 | Jeffrey |
| 3,943,351 A | | 3/1976 | Nilsson |
| 4,546,418 A | * | 10/1985 | Baggio et al. ............. 362/85 |
| 5,645,746 A | * | 7/1997 | Walsh ...................... 219/505 |
| 5,707,100 A | * | 1/1998 | Suyama et al. ........... 296/192 |
| 6,092,917 A | * | 7/2000 | Litke et al. ............... 362/490 |
| 6,315,436 B1 | | 11/2001 | Schenk et al. |

FOREIGN PATENT DOCUMENTS

| | | |
|---|---|---|
| DE | 3833 499 | 10/1988 |
| DE | 199 02 666 | 1/1999 |

* cited by examiner

Primary Examiner—Sandra O'Shea
Assistant Examiner—Jacob Y. Choi
(74) Attorney, Agent, or Firm—Crowell & Moring LLP

(57) ABSTRACT

An arrangement for providing indirect lighting to at least one coverable recess in a vehicle is provided. The at least one recess is arranged on the side of a control panel of a motor vehicle. In the recess electrical components are arranged and the recess is closed with a detachable cover. The inside of the detachable cover is equipped with a reflecting layer so that light from an existing light source in the vehicle is reflected into the recess so as to illuminate the electrical components.

21 Claims, 2 Drawing Sheets

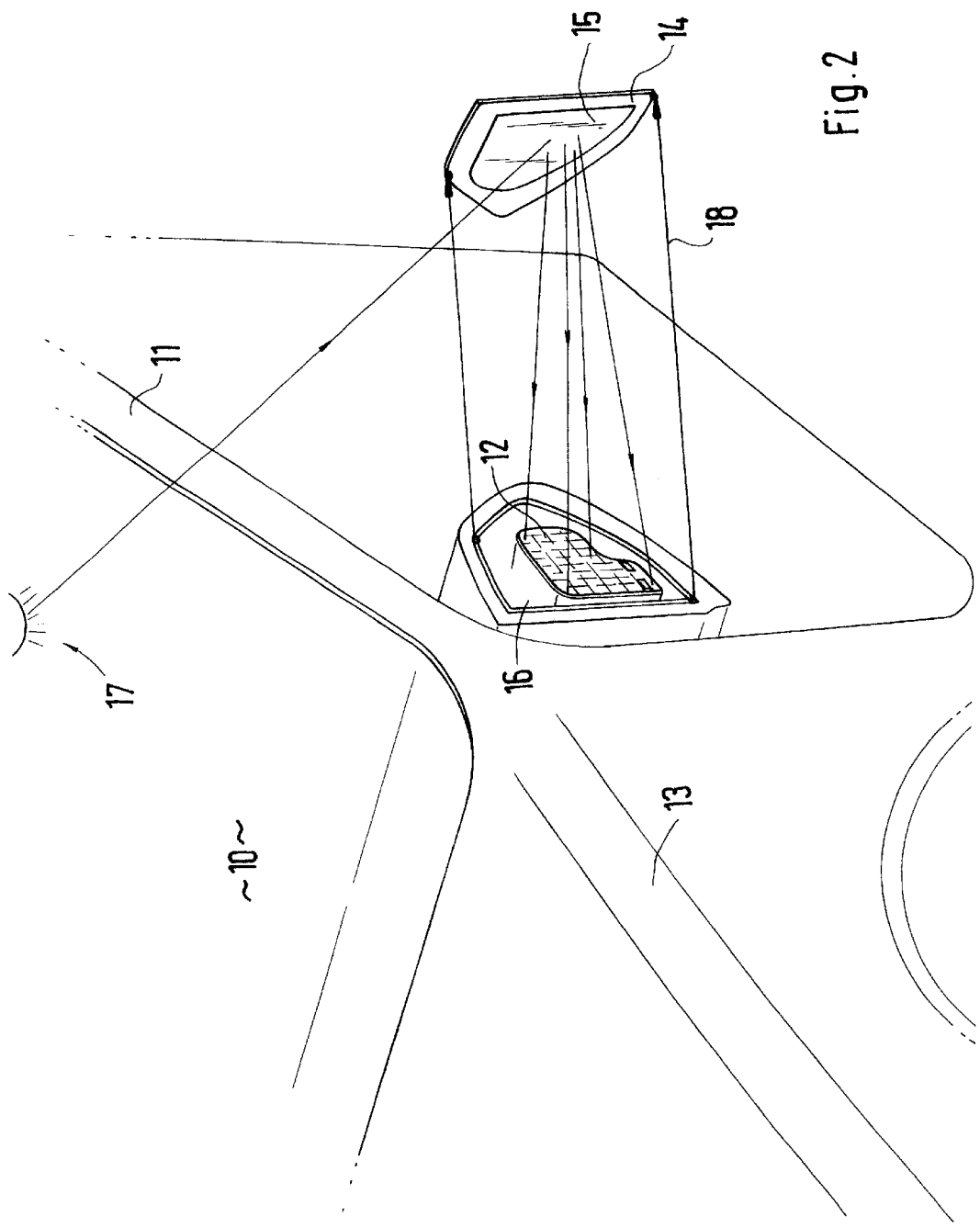

ARRANGEMENT FOR PROVIDING INDIRECT LIGHTING IN A VEHICLE

BACKGROUND OF THE INVENTION

This application claims the priority of Germany 101 08 4919.9, filed Feb. 22, 2001, the disclosure of which is expressly incorporated by reference herein.

The invention relates to an arrangement for providing indirect lighting to at least one coverable recess in a vehicle.

From German Patent Document DE 199 02 666 is already known a storage compartment, especially a glove compartment, for vehicles with a compartment housing, wherein the compartment housing contains at least two sections, which are arranged one above the other and are separated from one another by a transverse well, and a compartment opening on the front side, which allows access to the sections. In this arrangement, in order to provide sufficient lighting of the sections located one above the other, a downward shining lamp is arranged on the upper, transversely extending housing wall near the compartment opening and at least one radiator is arranged on the inside of the flap in such a way that in the folded-down position of the flap light from the lamp that impinges on the reflector is reflected into the depth of at least one lower section.

This arrangement with a lamp and a reflecting surface makes possible the illumination, however a separate lamp, whose light is then reflected into the interior, is provided. With the arrangement in accordance with the invention, such a lamp can be dispensed with and the light of a lamp, which is already arranged in the vehicle, such as a reading spotlight, can be used. At the same time, this reduces wiring efforts, which in turn ensures that such indirect lighting can be provided in any area of the vehicle without an additional effort.

The features described below and in the claims result in further beneficial improvements of the arrangement in accordance with the invention.

The reflecting surface, for example, can be formed by glued silver foils or a vaporization with aluminum on the interior of the fuse cover, which at the same time can be imprinted with the fuse configuration information, which facilities handling when replacing a fuse.

Another advantage of certain preferred embodiments of this invention is that the cover flap can be completely detachable, but is equipped with a closing device, for example, in the form of a catch strap since in this way the cover flap can be brought into the desired position randomly in order to reflect the light, but at the same time is secured against falling down.

Other objects, advantages and novel features of the present invention will become apparent from the following detailed description of the invention when considered in conjunction with the accompanying drawings.

BRIEF DESCRIPTION OF THE DRAWINGS

FIG. 2 shows the reflection of the light for illumination of a fuse base plate in a principle diagram, in accordance with a preferred embodiment of the invention.

DETAILED DESCRIPTION OF THE INVENTION

Figure 1:
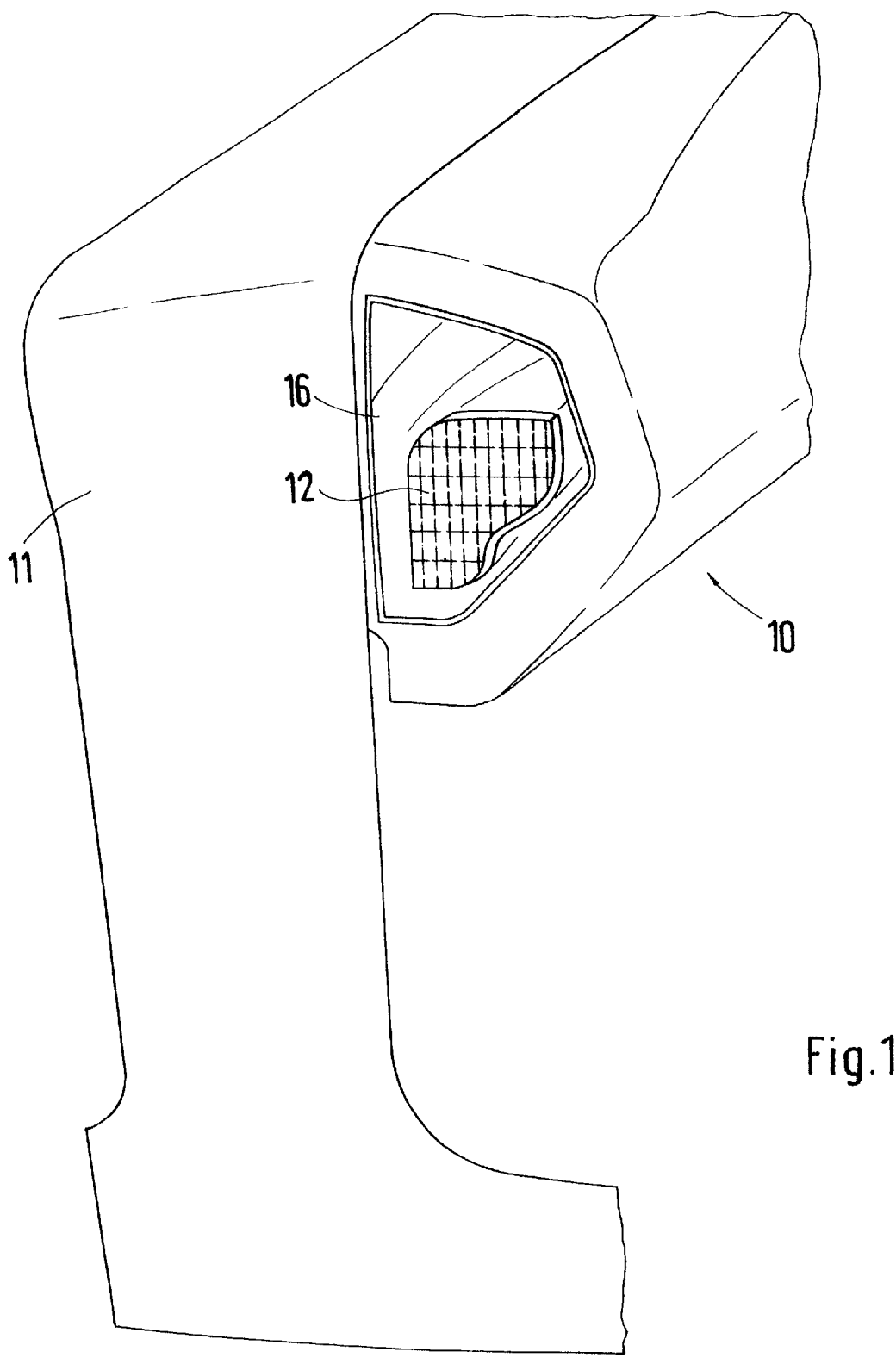
FIG. 1 is a diagrammatic side view of a control panel, constructed according to the preferred embodiment of the invention.

FIG. 1 shows a schematic view of the side of a control panel with an A-column of the motor vehicle. A recess 16 is provided on the control panel 10, either on one side or possibly also on both sides, in which a fuse base plate 12 is arranged. The recess 16 is locked by a detachable cover 14, which is not shown in FIG. 1.

FIG. 2 again shows the object of the invention, wherein the control panel is depicted from a perspective diagonally from the front. FIG. 2 shows the path of the beams for the light reflection in order to illuminate the fuse base plate 12. It shows sections of the A-column 11, the control panel 10, and a fender 13. On the left side of the control panel 10 in the driving direction, the fuse base plate 12 is arranged in the recess 16, which is covered by the cover 14 when closing the recess 16.

The detachable cover 14 can be taken off the side surface of the control panel 10 if needed so that the fuse base plate beneath is accessible to the driver and an appropriate replacement of the electrical components is possible. The interior of this cover 14 is equipped with a reflecting layer 15. This reflector 15 can be a silver colored foil, on which at the same time an imprint for the fuse arrangement can be incorporated. With this reflector 15, light from a light source 17 located in the interior of the vehicle, for example, a reading spotlight 17, can be deflected onto the fuse base plate 12 in such a way that an easy replacement of the fuses is made possible for the driver. Upon removal, the detachable cover 14 can either be detached completely from the control panel or be fastened to the control panel, for example, with a type of catch strap schematically depicted in dash lines in FIG. 2. Either way, it is possible to move the cover separately in such a way that the light from the light source 17 is reflected to the desired location of the fuse base plate 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Arrangement for providing indirect lighting to at least one coverable recess, wherein the at least one recess is arranged on a side of a control panel of a motor vehicle, wherein electrical components are arranged in the recess, wherein the recess can be closed with a detachable cover, and wherein an inside of the detachable cover is equipped with a reflecting layer so that light from an existing light source in the vehicle is reflected into the recess so as to illuminate the electrical components, said detachable cover in use being disposed such that it can be brought into a desired position randomly to facilitate reflecting of said light into the recess.

2. Arrangement according to claim 1, wherein the reflecting layer is a silver foil.

3. Arrangement according to claim 1, wherein the reflecting layer is formed by vaporizing the inside of the cover with aluminum.

4. Arrangement according to claim 1, wherein the electrical components are fuses on a fuse base plate.

5. Arrangement according to claim 1, wherein a reading spotlight is the existing light source.

6. Arrangement according to claim 2, wherein a configuration pattern for the fuse base plate is imprinted on the reflecting layer.

7. Arrangement according to claim 3, wherein a reading spotlight is the existing light source.

8. Arrangement according to claim 4, wherein a reading spotlight is the existing light source.

9. Arrangement according to claim 1, wherein the detachable cover is fastened to the control panel with a catch strap.

10. Arrangement according to claim 2, wherein the detachable cover is fastened to the control pane with a catch strap.

11. Arrangement according to claim 3, wherein the detachable cover is fastened to the control panel with a catch strap.

12. Arrangement according to claim 4, wherein the detachable cover is fastened to the control panel with a catch strap.

13. Arrangement according to claim 5, wherein the detachable cover is fastened to the control panel with a catch strap.

14. Arrangement according to claim 6, wherein the detachable cover is fastened to the control panel with a catch strap.

15. A passenger vehicle assembly comprising:

a control panel, a recess in the control panel for accommodating electrical components, a light source located in a passenger space facing the control panel for providing lighting to the passenger space, and a detachable cover which covers the recess and is detachable from the recess for accommodating access to the electrical components, wherein said detachable cover includes a light reflecting layer which is operable to direct light from the light source to illuminate the recess and electrical components so that a separate light source for the recess can be dispensed with, said detachable cover in use being disposed such that it can be brought into a desired position randomly to facilitate reflecting of said light into the recess.

16. Arrangement according to claim 15, wherein the reflecting layer is a silver foil.

17. Arrangement according to claim 15, wherein the reflecting layer is formed by vaporizing the inside of the cover with aluminum.

18. Arrangement according to claim 15, wherein the electrical components are fuses on a fuse base plate.

19. Arrangement according to claim 15, wherein the light source is a reading light.

20. Arrangement according to claim 18, wherein a configuration pattern for the fuse base plate is imprinted on the reflecting layer.

21. Arrangement according to claim 15, wherein the detachable cover is fastened to the control panel with a catch strap.

* * * * *